US008994960B2

(12) United States Patent
Shimahashi

(10) Patent No.: US 8,994,960 B2
(45) Date of Patent: Mar. 31, 2015

(54) IMAGE FORMING DEVICE THAT EXPANDS THE SIZE OF SELECTED OBJECTS USING TONER OF PLURAL COLORS

(75) Inventor: Takuya Shimahashi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 87 days.

(21) Appl. No.: 13/362,995

(22) Filed: Jan. 31, 2012

(65) Prior Publication Data

US 2012/0250035 A1 Oct. 4, 2012

(30) Foreign Application Priority Data

Mar. 28, 2011 (JP) ................................. 2011-069587

(51) Int. Cl.
G06F 3/12 (2006.01)
H04N 1/58 (2006.01)

(52) U.S. Cl.
CPC ...................................... H04N 1/58 (2013.01)
USPC ............ 358/1.1; 358/1.9; 358/1.13; 358/530; 347/41; 382/167

(58) Field of Classification Search
USPC ....................... 358/1.9, 1.13; 347/41; 382/167
See application file for complete search history.

(56) References Cited

U.S. PATENT DOCUMENTS

| 6,270,186 | B1 * | 8/2001 | Smith et al. ...................... 347/41 |
| 6,352,806 | B1 * | 3/2002 | Dalal ............................. 430/45.4 |
| 6,433,889 | B1 * | 8/2002 | Tanabe ........................... 358/1.9 |
| 7,362,467 | B1 * | 4/2008 | Tsukimura ...................... 358/1.9 |
| 8,027,064 | B2 * | 9/2011 | Shin .............................. 358/3.26 |
| 2005/0062995 | A1 * | 3/2005 | Loce et al. ...................... 358/1.9 |
| 2006/0227146 | A1 * | 10/2006 | Allen ............................. 345/589 |
| 2006/0251322 | A1 * | 11/2006 | Palum et al. .................. 382/167 |
| 2007/0201046 | A1 * | 8/2007 | Oda et al. ....................... 358/1.1 |
| 2008/0137147 | A1 * | 6/2008 | Nakano et al. ............... 358/3.06 |
| 2008/0174797 | A1 * | 7/2008 | Shin .............................. 358/1.9 |
| 2008/0219685 | A1 * | 9/2008 | Muratani ........................ 399/45 |
| 2008/0310738 | A1 * | 12/2008 | Katoh et al. .................. 382/225 |
| 2009/0033968 | A1 * | 2/2009 | Lapstun et al. ............... 358/1.9 |
| 2009/0086249 | A1 * | 4/2009 | Sakurai ........................ 358/1.13 |
| 2009/0148003 | A1 * | 6/2009 | Chen ............................. 382/112 |
| 2010/0103215 | A1 * | 4/2010 | Iriguchi ......................... 347/14 |
| 2010/0134542 | A1 * | 6/2010 | Hill ................................. 347/9 |
| 2010/0177959 | A1 * | 7/2010 | Withum et al. ............... 382/163 |
| 2010/0290067 | A1 * | 11/2010 | Miyake et al. ................. 358/1.9 |

(Continued)

FOREIGN PATENT DOCUMENTS

| JP | H10-282756 A | | 10/1998 | | |
| JP | 2011068078 A | * | 4/2011 | ............. | B41F 33/00 |
| WO | WO 2009152655 A1 | * | 12/2009 | ............. | G06K 15/02 |

*Primary Examiner* — Fred Guillermety
*Assistant Examiner* — Edwin S Leland, III
(74) *Attorney, Agent, or Firm* — Baker Botts L.L.P.

(57) ABSTRACT

In an image forming device, an edge expansion unit executes an edge expansion process on an edge of an object by modifying image data so as to expand at least a first toner layer at the edge by a predetermined number of pixels' worth of width so that a surface area occupied by the first toner layer is larger than that occupied by a second toner layer along a recording surface, the first toner layer being made up of toner of a first color that is transferred onto the recording surface among a plurality of colors, the second toner layer being made up of toner of remaining color other than the first color, the edge expansion unit supplying the modified image data to an image forming unit, thereby causing the image forming unit to form an image represented by the modified image data.

11 Claims, 13 Drawing Sheets

(56) References Cited

U.S. PATENT DOCUMENTS

| | | | |
|---|---|---|---|
| 2011/0090522 A1* | 4/2011 | Jia et al. | 358/1.9 |
| 2011/0151373 A1* | 6/2011 | Ayaki et al. | 430/124.1 |
| 2011/0164816 A1* | 7/2011 | Guo | 382/165 |
| 2011/0304861 A1* | 12/2011 | Monga et al. | 358/1.9 |
| 2011/0317174 A1* | 12/2011 | Shimahashi | 358/1.1 |
| 2012/0212512 A1* | 8/2012 | Kiyotaki | 345/660 |

* cited by examiner

FIG.3
IMAGE DATA
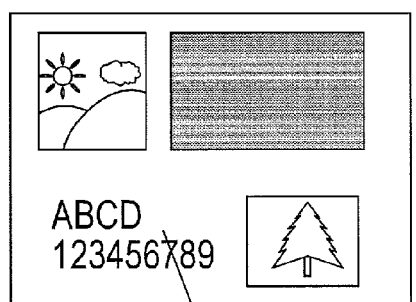
↓ ENLARGEMENT
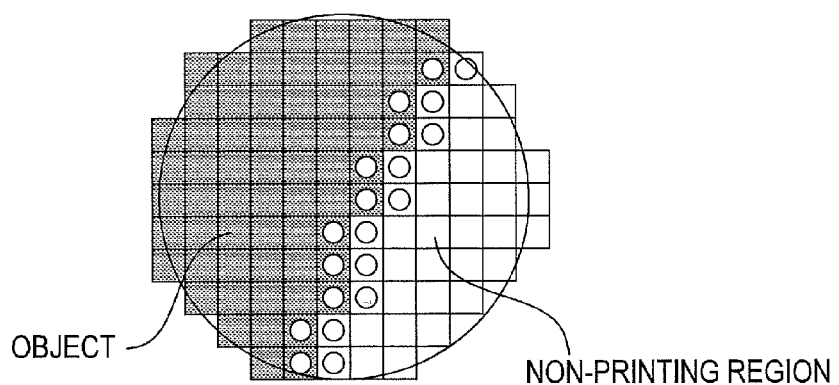
OBJECT  NON-PRINTING REGION
PIXELS IN AN ORIGINAL DOCUMENT
- PI ▨ A PIXEL WITHIN THE OBJECT
- PIb ⊡ A PIXEL IN THE OBJECT THAT IS ADJACENT TO A NON-PRINTING REGION
- POb ⊙ A PIXEL WITHIN THE NON-PRINTING REGION THAT IS ADJACENT TO THE OBJECT REGION
- PO ☐ A PIXEL IN THE NON-PRINTING REGION

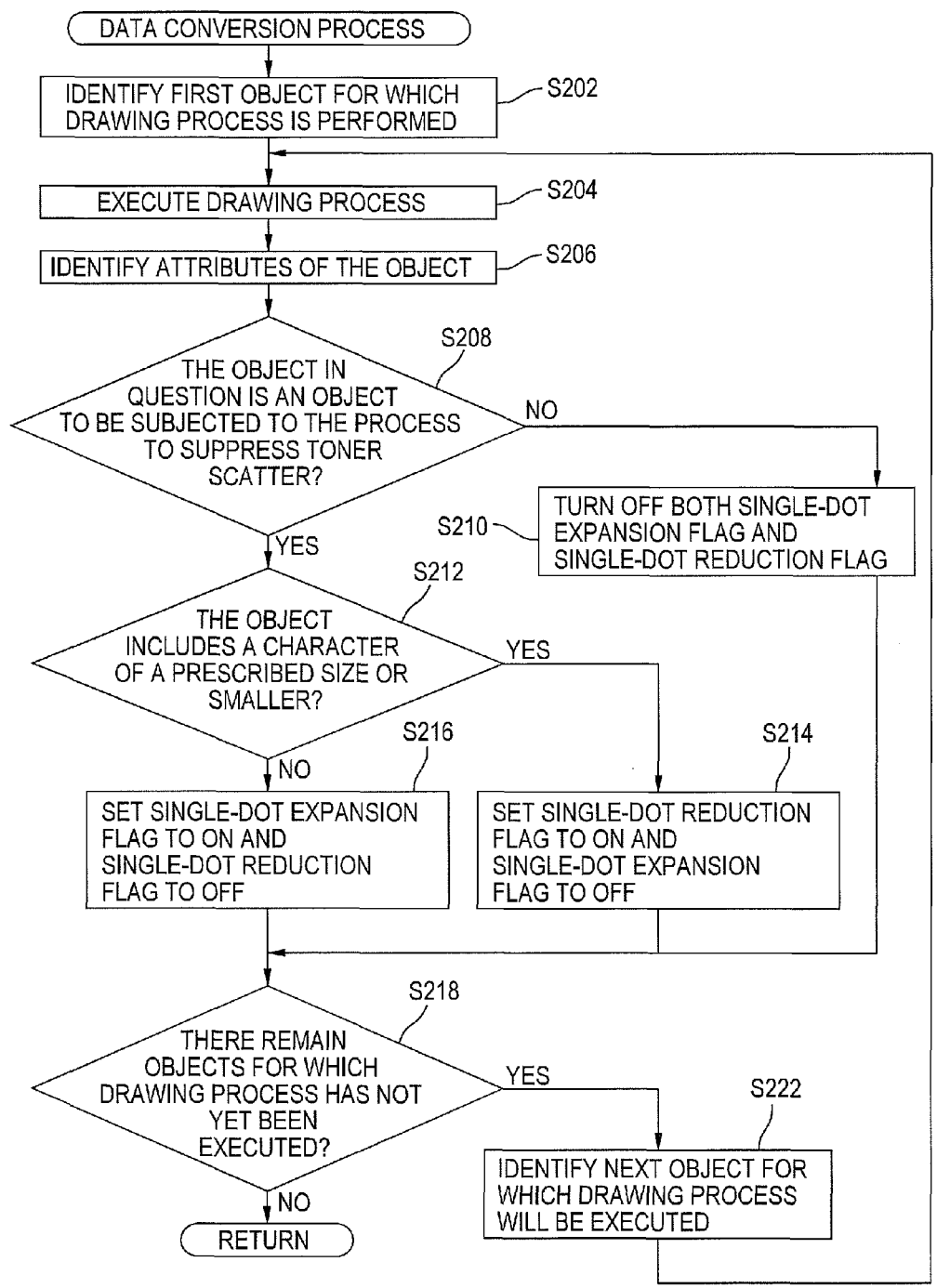

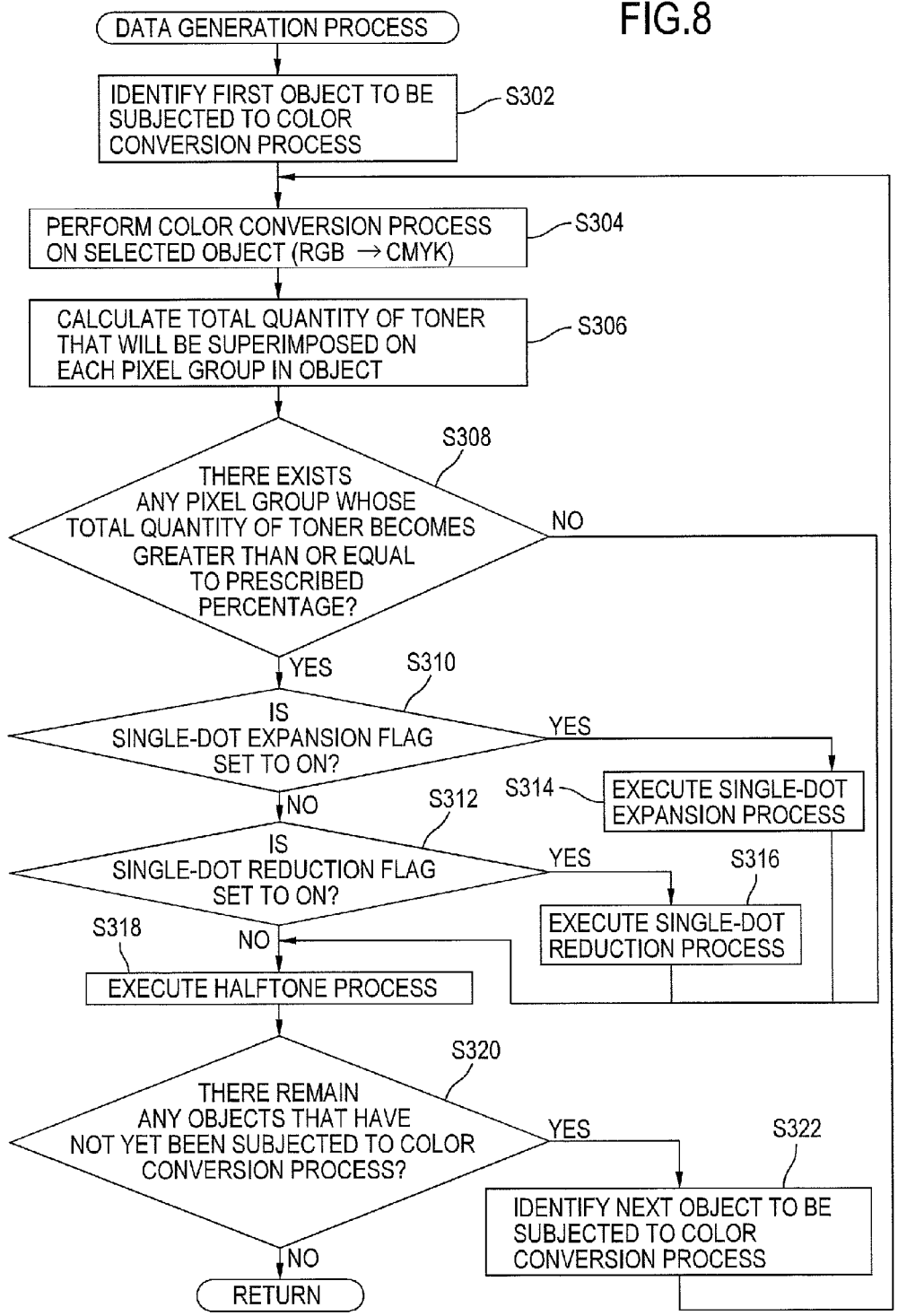

REGION OF OBJECT

REGION OBTAINED BY EXPANDING OBJECT
AT EACH EDGE BY WIDTH OF TWO DOTS

REGION OF OBJECT

REGION OBTAINED BY EXPANDING OBJECT
AT EACH EDGE BY WIDTH OF THREE DOTS

IMAGE FORMING DEVICE THAT EXPANDS THE SIZE OF SELECTED OBJECTS USING TONER OF PLURAL COLORS

CROSS REFERENCE TO RELATED APPLICATION

This application claims priority from Japanese Patent Application No. 2011-069587 filed Mar. 28, 2011. The entire content of this priority application is incorporated herein by reference.

TECHNICAL FIELD

The present invention relates to an image-forming technology using toner in a plurality of colors.

BACKGROUND

When forming images by superposing toner images of a plurality of colors, the toner is transferred to regions (hereinafter called "objects") that constitute the image. A phenomenon called "toner scatter" is known to occur during this image-forming operation, whereby toner transferred to positions near edges of the objects scatters outside of the objects.

Conventional techniques have been proposed for suppressing toner scatter. For example, one method involves determining in advance the portion of toner extending beyond edges of an image and to reduce the quantity of toner used near the edges of the image based on this calculated portion.

SUMMARY

However, when reducing the quantity of toner used near edges of objects according to the above conventional method, small characters and the like in the image can become blurred and indistinct.

In order to resolve this problem, it is an object of the present invention to provide a technology for reducing the occurrence of blurring in images and to suppress toner scatter.

In order to attain the above and other objects, the invention provides an image forming device, including: an image forming unit; an edge detecting unit; and an edge expansion unit. The image forming unit is configured to form toner images using toner of a plurality of colors and sequentially transferring the toner images onto a recording surface of a recording medium, thereby forming an image on the recording surface of the recording medium. The edge detecting unit is configured to detect an edge of an object constituting a desired image represented by image data. The edge expansion unit is configured to execute an edge expansion process on the edge of the object by modifying the image data so as to expand at least a first toner layer at the edge by a predetermined number of pixels' worth of width so that a surface area occupied by the first toner layer is larger than that occupied by a second toner layer along the recording surface, the first toner layer being made up of toner of a first color that is transferred onto the recording surface among the plurality of colors, the second toner layer being made up of toner of remaining color other than the first color, the edge expansion unit supplying the modified image data to the image forming unit, thereby causing the image forming unit to form an image represented by the modified image data.

According to another aspect, the present invention provides an image forming system, including: an image forming device; and a terminal device. The image forming device includes an image forming unit that is configured to form toner images using toner of a plurality of colors and sequentially transferring the toner images onto a recording surface of a recording medium, thereby forming an image on the recording surface of the recording medium. The terminal device includes: an edge detecting unit; and an edge expansion unit. The edge detecting unit is configured to detect an edge of an object constituting a desired image represented by image data. The edge expansion unit is configured to execute an edge expansion process on the edge of the object by modifying the image data so as to expand at least a first toner layer at the edge by a predetermined number of pixels' worth of width so that a surface area occupied by the first toner layer is larger than that occupied by a second toner layer along the recording surface, the first toner layer being made up of toner of a first color that is transferred onto the recording surface among the plurality of colors, the second toner layer being made up of toner of remaining color other than the first color, the edge expansion unit supplying the modified image data to the image forming device, thereby causing the image forming unit to form an image represented by the modified image data.

According to still another object, the present invention provides a method of forming an image by forming toner images using toner of a plurality of colors and sequentially transferring the toner images onto a recording surface of a recording medium, the method including: detecting an edge of an object constituting a desired image represented by image data; executing an edge expansion process on the edge of the object by modifying the image data so as to expand at least a first toner layer at the edge by a predetermined number of pixels' worth of width so that a surface area occupied by the first toner layer is larger than that occupied by a second toner layer along the recording surface, the first toner layer being made up of toner of a first color that is transferred onto the recording surface among the plurality of colors, the second toner layer being made up of toner of remaining color other than the first color; and forming toner images based on the modified image data by using toner of the plurality of colors and sequentially transferring the toner images onto the recording surface of the recording medium, thereby forming an image represented by the modified image data on the recording surface of the recording medium.

BRIEF DESCRIPTION OF THE DRAWINGS

The particular features and advantages of the invention as well as other objects will become apparent from the following description taken in connection with the accompanying drawings, in which:

FIGS. 2(A) and 2(B) show the states of toner when a toner image is transferred onto paper, wherein FIG. 2(A) shows the state of toner when toner scatter does not occur, and FIG. 2(B) shows the state of toner when toner scatter occurs;

FIG. 3 illustrates an edge portion of an object;

FIG. 7 is a flowchart showing a data conversion process in the printing process;

FIG. 8 is a flowchart showing a data generation process in the printing process;

FIGS. 9(A) and 9(B) show the states of toner when a single-dot expansion process is executed onto each edge of an object according to a variation of the first embodiment to produce the object using toner in three or more colors, wherein FIG. 9(A) shows a case in which the object is produced using three colors of toner, while FIG. 9(B) shows a case in which the object is generated using four colors of toner;

FIGS. 10(A) and 10(B) show the states of toner when executing a single-dot reduction process onto each edge of an object according to the variation of the first embodiment, wherein FIG. 10(A) shows a case in which the object is produced using three colors of toner, while FIG. 10(B) shows a case in which the object is generated using four colors of toner;

FIGS. 11(A) and 11(B) show the states of toner when executing a process to suppress toner scatter according to another embodiment, wherein FIG. 11(A) shows a case in which the object is generated using three colors of toner, while FIG. 11(B) shows a case in which the object is generated using four colors of toner;

FIGS. 12(A) and 12(B) show the states of toner when executing a process to suppress toner scatter according to still another embodiment, wherein FIG. 12(A) shows the state of toner when executing a single-dot expansion process onto two pixels at each edge of an object, and FIG. 12(B) shows the state of toner when executing a single-dot reduction process onto two pixels at each edge of an object.

DETAILED DESCRIPTION

Figure 1:
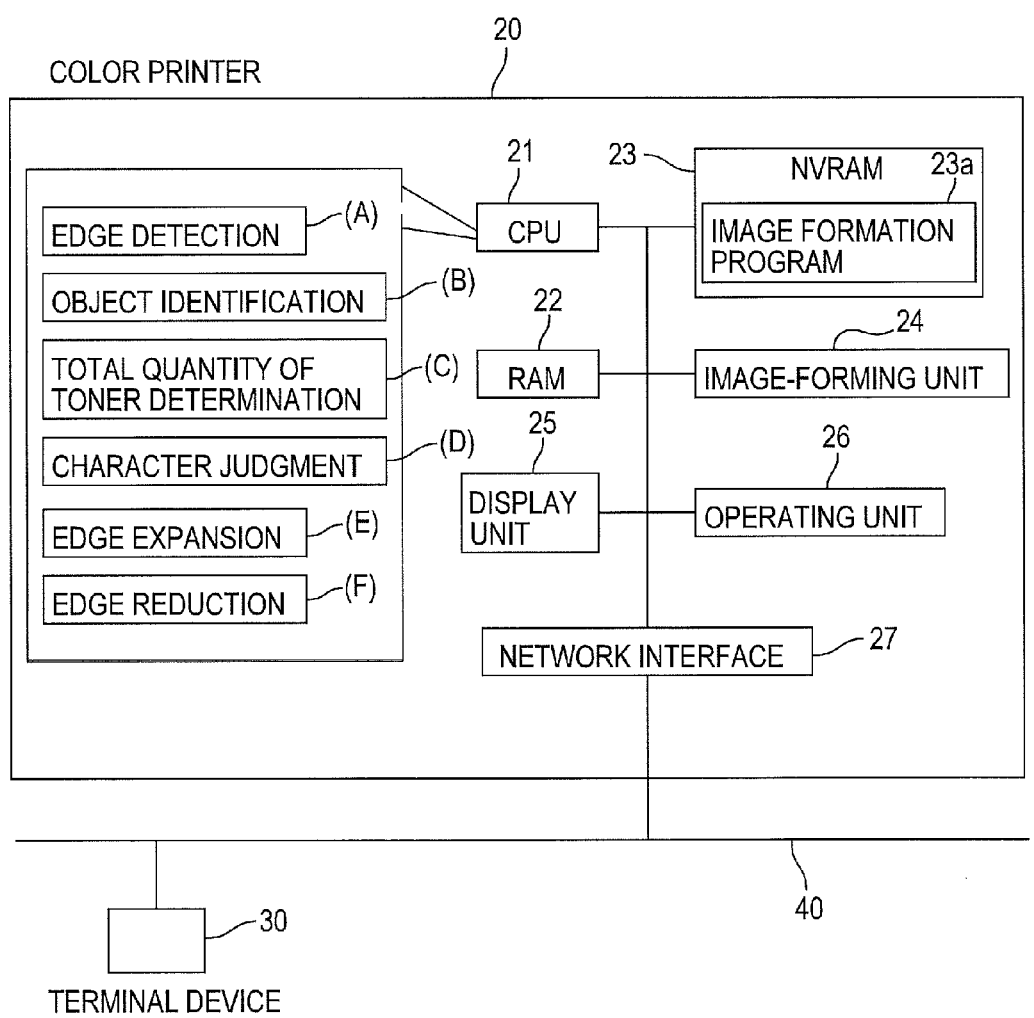
FIG. 1 is a block diagram schematically showing the configuration of a color printer according to a first embodiment of the present invention.

Next, embodiments of the present invention will be described in order of the contents given below.
A. First Embodiment
  A-1. Structure of a Color Printer
  A-2. Overview of a Process to Suppress Toner Scatter
    A-2-1. Method of Implementing the Process to Suppress Toner Scatter
    A-2-2. Conditions for Executing the Process to Suppress Toner Scatter
  A-3. Printing Process
    A-3-1. Data Conversion Process
    A-3-2. Data Generation Process
  A-4. Variations of the First Embodiment
B. Other Embodiments A. First Embodiment A-1. Structure of a Color Printer FIG. 1 is a block diagram showing the general structure of a color printer 20 according to the first embodiment.

The color printer 20 of the first embodiment includes a CPU 21, a RAM 22, an NVRAM 23, an image-forming unit 24, a display unit 25, an operating unit 26, and a network interface 27, all of which components are interconnected via an internal bus. The color printer 20 is connected to a local area network (LAN) 40 via the network interface 27. A terminal device 30 is also connected to the LAN 40 and can issue commands to the color printer 20 via the LAN 40. The color printer 20 executes processes in response to commands received from the terminal device 30. Note that a plurality of terminal devices 30, rather than a single terminal device 30, may be connected to the LAN 40.

The CPU 21 controls the operations of the color printer 20. In the first embodiment, the NVRAM 23 stores an image formation program 23a for controlling the formation of images on paper. The CPU 21 reads the image formation program 23a stored in the NVRAM 23 into the RAM 22 and executes the program, whereby the CPU 21 can control an image-forming operation by the color printer 20.

The image-forming unit 24 includes process cartridges, each having a photosensitive drum, charger, and the like. The CPU 21 forms images on paper using toner in a plurality of colors based on image data received from the terminal device 30. The image data is described in a page description language (hereinafter "PDL"). A PDL is a language used for instructing a printer to print an electronic document. Image data described in a PDL includes position data for each object constituting the image, and drawing commands specifying format data for character string objects. The CPU 21 converts this image data to print data expressed by raster images. Subsequently, the CPU 21 controls the image-forming unit 24 to form latent images on the photosensitive drums, which have been charged by the chargers, based on print data, and to develop the latent images into toner images using toner of a corresponding color. In the embodiment, the color printer 20 includes a plurality of photosensitive drums and forms toner images using a single toner color for each photosensitive drum. The toner images are then transferred onto paper.

While the color printer 20 of the embodiment acquires image data from the terminal device 30, the image data may be acquired in some other way. For example, the color printer 20 may be provided with a reading unit (not shown) and may acquire image data from the reading unit when the reading unit reads an image from an original.

In this example, the color printer 20 is provided with the display unit 25 and operating unit 26. The display unit 25 includes a liquid crystal panel, for example, for displaying various screen images. The user can operate the operating unit 26 to select items displayed on the display unit 25. However, the display unit 25 may also be configured of a liquid crystal panel with touch sensors. In this case, the display unit 25 functions as the operating unit 26. In other words, the user touches areas of the screen displayed on the display unit 25 to select desired items.

The reading unit described above may also include a reading sensor having a plurality of image sensors, such as charge-coupled devices (CCD) for reading an image from an original placed on a platen, and a drive unit for driving the reading sensor. Alternatively, the reading unit may include the reading sensor, and a conveying unit for conveying the original document. In other words, the reading unit may be configured to read images from originals according to a flatbed scanner method or an automatic document feeder method.

Figure 2A:
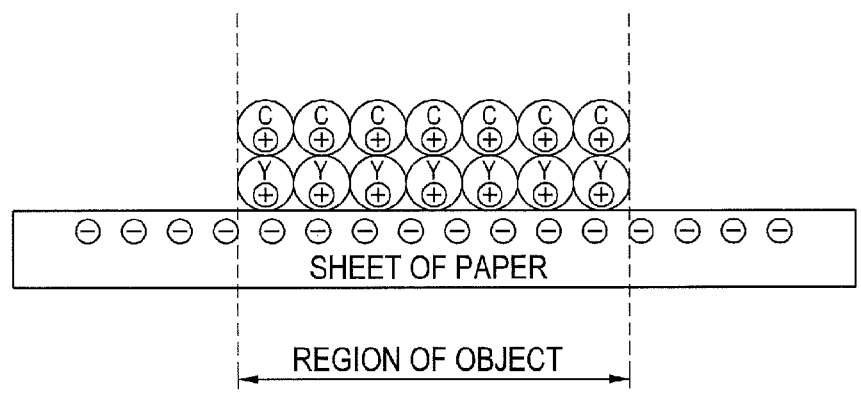
Figure 2B:
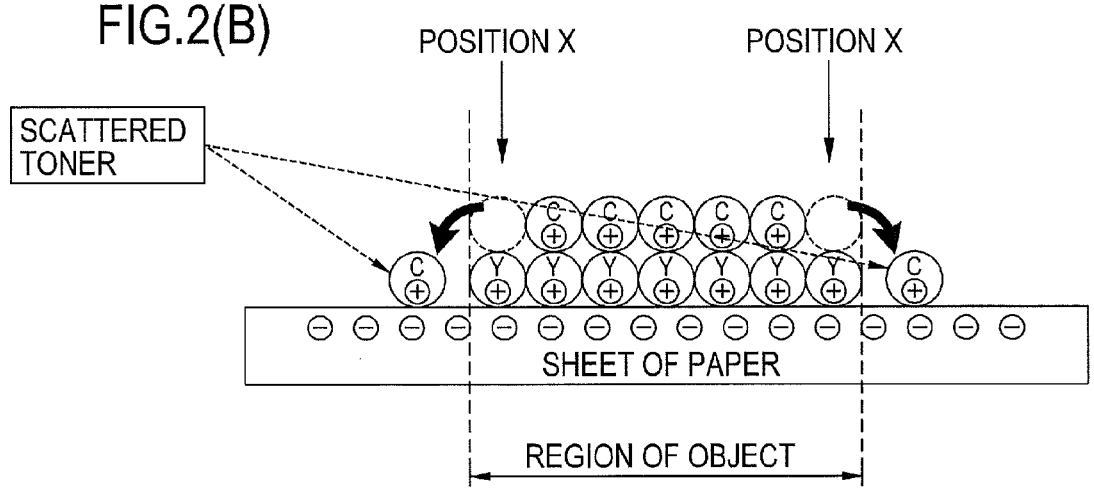

A-2. Overview of a Process to Suppress Toner Scatter
A-2-1. Method of Implementing the Process to Suppress Toner Scatter Here, the principal causes of toner scatter will be described. FIGS. 2(A) and 2(B) show the states of toner when a toner image is transferred onto paper. In this example, a green object is being produced. FIG. 2(A) shows the state of toner when toner scatter does not occur, while FIG. 2(B) shows the state of toner when toner scatter occurs. For the sake of description, only one particle of toner is shown for each pixel.

To produce a green object, the CPU 21 commands the image-forming unit 24 to transfer cyan and yellow toner, from among the four toner colors cyan, magenta, yellow, and black, to paper. In the embodiment, the color printer 20 transfers toner to paper by developing electrostatic latent images on photosensitive members with toner and electrically attracting the developed toner images to the paper.

As shown in FIG. 2(B), toner on the photosensitive drum may be electrically attracted to positions outside the region of the object when transferred from the photosensitive drum to the paper. In this example, cyan toner transferred to the pixels at positions X, in particular, are considered susceptible to scattering outside the object. Thus, it can be predicted that the electrical attraction will scatter toner in this way.

Therefore, the CPU 21 in the color printer 20 according to the embodiment executes a process described later in greater detail to suppress toner scatter when transferring toner images onto paper.

FIG. 3 illustrates an edge portion of an object. In FIG. 3, a pixel PI is a pixel within the object that is not adjacent to a non-printing region (a region in which no toner of any color is transferred); a pixel PIb is a pixel in the object that is adjacent to a non-printing region; a pixel POb is a pixel within the non-printing region that is adjacent to the object; and a pixel PO is a pixel in the non-printing region that is not adjacent to the object. Here, "adjacent" denotes that a pixel abuts another pixel positioned above, below, left, or right of the first pixel. In the embodiment, "edge portion" denotes the portion made up from pixels PIb and pixels POb in FIG. 3.

In the process of the embodiment to suppress toner scatter, the CPU 21 executes one of the following processes (a) or (b) according to the type of object being processed: (a) a process for increasing the number of pixels to which toner of a specific color is transferred by transferring toner of the specific color to pixels POb in FIG. 3 (hereinafter referred to as a "single-dot expansion process"), or (b) a process for reducing the number of pixels to which toner of a specific color is transferred by not transferring toner of the specific color to the pixels PIb in FIG. 3 (hereinafter referred to as a "single-dot reduction process").

First the CPU 21 determines whether the object includes a character of a prescribed size or smaller. If the object does not include a character of the prescribed size or smaller, the CPU 21 executes the single-dot expansion process on toner of the color to be initially transferred to the paper. However, if the object includes a character of the prescribed size or smaller, the CPU 21 executes the single-dot reduction process on toner of the color that will be transferred second to the paper. In the embodiment, the prescribed size is four (4) points.

Both of the processes described above serve to make the surface area of the paper occupied by the toner transferred first larger than the surface area occupied by toner of the color transferred second.

In the embodiment, the CPU 21 selects which of the single-dot expansion process and single-dot reduction process to perform by determining whether the object includes a character of the prescribed size or smaller for the following reason. When the object includes a small character, the single-dot expansion process may make the character illegible because pixels in non-printing regions inside the object become linked together.

Hence, when the CPU 21 determines that the object includes a character of the prescribed size or smaller, in the present embodiment the CPU 21 executes the single-dot reduction process in order not to expand the region occupied by the object.

Figure 4A:
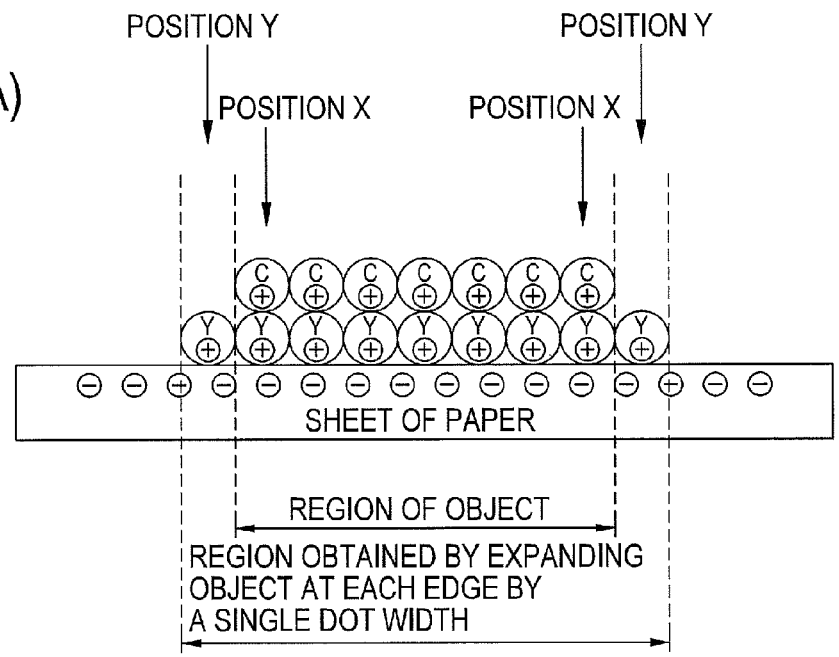
FIG. 4(A) shows a state of toner when a single-dot expansion process is executed onto each edge of an object according to the first embodiment to produce the object using toner in two colors.
Figure 4B:
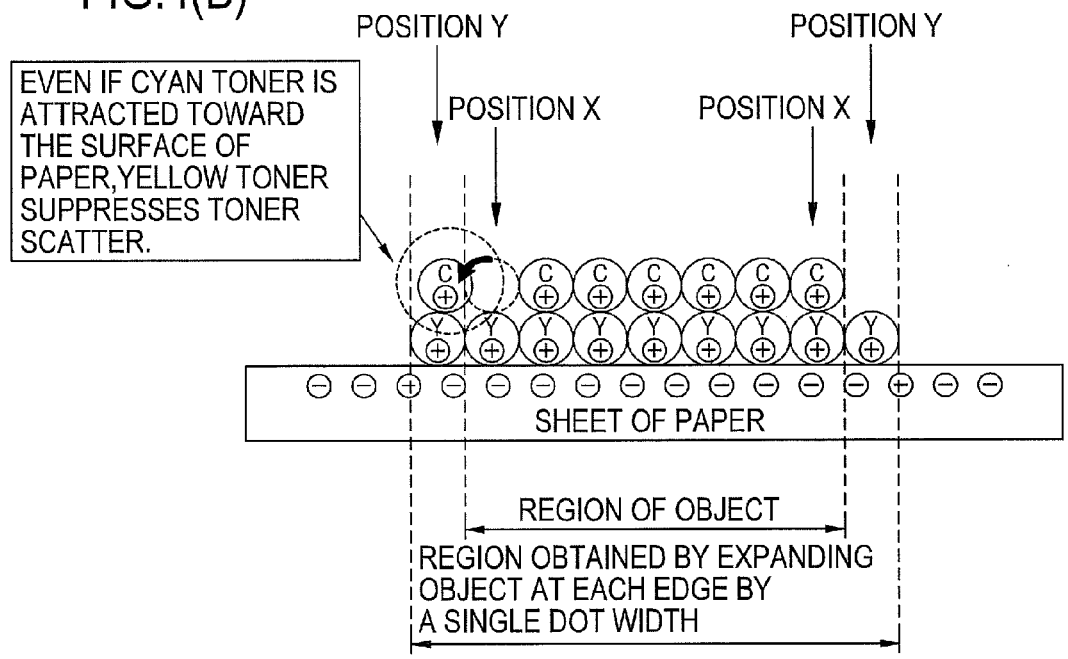
FIG. 4(B) illustrates how to suppress toner scatter through the single-dot expansion process.

FIGS. 4(A) and 4(B) show the states of toner used to produce an object when the single-dot expansion process is executed. In the example of FIGS. 4(A) and 4(B), the object has left-side and right-side edges, and therefore the single-dot expansion process is executed onto each edge.

As shown in FIG. 4(A), the CPU 21 transfers yellow toner but not cyan toner to pixels at positions Y. Therefore, even if cyan toner is attracted to the surface of the paper from the top of the yellow toner deposited for pixels at positions X, as illustrated in FIG. 4(B), the yellow toner transferred to pixels at positions Y serve to receive the attracted cyan toner, reducing the potential for toner scatter. In other words, the cyan toner shifts on top of the yellow toner, but is prevented from scattering outside the object.

Figure 5A:
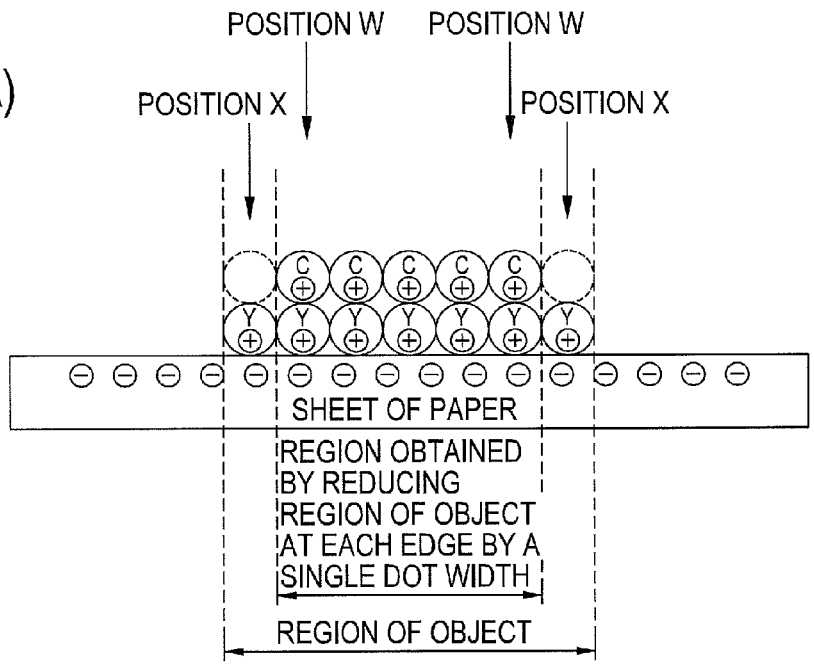
FIG. 5(A) shows a state of toner when a single-dot reduction process is executed onto each edge of an object according to the first embodiment to produce the object using toner in two colors.
Figure 5B:
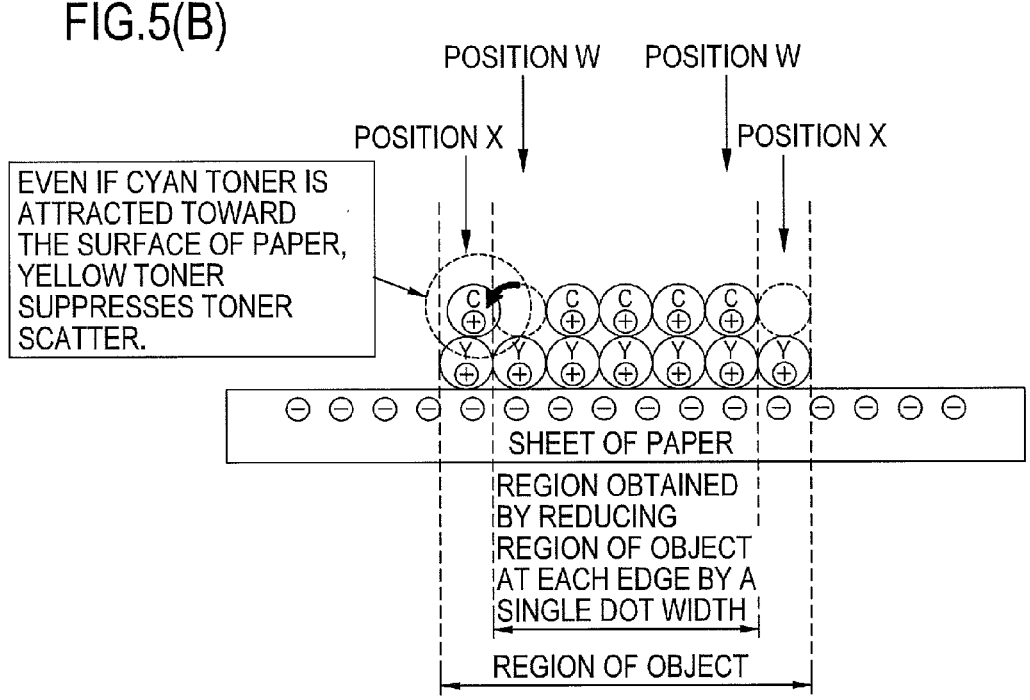
FIG. 5(B) illustrates how to suppress toner scatter through the single-dot reduction process.

FIGS. 5(A) and 5(B) show the states of toner particles deposited when generating a green object while reducing the area of cyan toner one pixel worth along the edge of the object region through the single-dot reduction process.

As shown in FIG. 5(A), the CPU 21 transfers yellow toner but not cyan toner to pixels at positions X. In this way, even if cyan toner is attracted toward the surface of paper from the top of yellow toner at pixels in positions W adjacent to the pixels at positions X, as illustrated in FIG. 5(B), the yellow toner transferred to pixels at positions X serve to receive the cyan toner. Accordingly, this arrangement can reduce the potential for toner scatter similar to the single-dot expansion process described above.

A-2-2. Conditions for Executing the Process to Suppress Toner Scatter

Here, the conditions for executing the process to suppress toner scatter will be described. In the embodiment, there are two conditions that must be met for the CPU 21 to execute this process: (1) the object must be configured of a single color rendered using toner in at least two of the four CMYK colors, and (2) toner of at least a prescribed percentage must be superimposed for each group of pixels in the object having the same number as the number of pixels in a dither matrix used in a halftone process described later.

Next, a halftone process using a dither matrix will be described briefly. A dither matrix is a conversion table configured of a preset number of pixels (32×32 dots, for example). In the halftone process, the CPU 21 first divides the image to be printed into groups of pixels having the same number of pixels as the number in the dither matrix. Next, the CPU 21 determines whether a toner transfer will be performed for each pixel by comparing the value associated with each pixel in the dither matrix (threshold value) to the value of pixels in each group (pixel value) at positions corresponding to the pixels in the dither matrix. That is, the CPU 21 determines that toner will be transferred when the value of a pixel in the pixel group is higher than the corresponding value in the dither matrix and that toner will not be transferred when the value is lower than the corresponding value in the dither matrix.

Next, condition (1) for executing the process to suppress toner scatter will be described.

Scattering tends to be more outstanding in the case where the object is configured of a single color than in the case where the object is configured of a plurality of colors. Contrarily, changes of color in the edge portion of the object that will result from the process for suppressing toner scatter tend to be less outstanding in the case where the object is configured of a single color than in the case where the object is configured of a plurality of colors. More specifically, when the process to suppress toner scatter is executed, the color in the edge portion of an object changes uniformly when the object is configured of a single color. Therefore, the visual impact of changes in an object configured of a single color will be less than that in an object configured of a plurality of colors. In addition, when the single color is rendered using toner in at least two colors, the object will be formed by superimposing toner in at least two colors one on another. With respect to such an object, toner scatter should be suppressed by executing the process to suppress toner scatter according to the present embodiment. Hence, the CPU 21 executes the process for suppressing toner scatter according to the present embodiment only when the object is configured of a single color that is made up of toner in at least two colors. The CPU 21 executes the process for suppressing toner scatter onto such an object even if the object is a text or a diagram.

Next, condition (2) for executing the process to suppress toner scatter will be described. In general, toner scatter is more likely to occur when greater quantities of toner are superimposed in each pixel of an object. In the embodiment, the CPU 21 performs the process to suppress toner scatter when at least a prescribed percentage of toner is superimposed in each of at least one pixel group constituting the object, each pixel group having the same number of pixels as the dither matrix described above. The prescribed percentage used in the embodiment is 160 percent. Thus, the CPU 21 performs the process to suppress toner scatter when the percentage of superimposed toner becomes greater than or equal to 160 percent in each of at least one pixel group constituting the object.

Here, a value of 100% will be assigned to the case in which one specific color is superimposed in all pixels of a pixel group. As an example, if the number of pixels included in a pixel group is 1024 (32×32 dots) and if cyan toner is to be transferred for 512 pixels, magenta toner for 256 pixels, yellow toner for 512 pixels, and black toner for 0 pixels, the percentage of superimposed toner for the pixel group will be {(512/1024)+(256/1024)+(512/1024)+(0/1024)}×100=125 [%].

In the above description, an object is generated using two colors of toner. So, through the single-dot expansion process, a toner layer of one color that is transferred onto the surface of paper first (first transferred color toner layer) is expanded at each edge of the object by a single dot width along the surface of the paper while the surface area occupied by a toner layer of the second color that is transferred second (second transferred color toner layer) is not changed. Through the single-dot reduction process, the second transferred color toner layer is reduced at each edge of the object by a single dot width along the surface of the paper while the surface area occupied by the first transferred color toner layer is not changed. Both of the single-dot expansion process and the single-dot reduction process serve to make the positions of the edges in the second transferred color toner layer be shifted in a direction toward the inside of the region of the object from the positions of the edges in the first transferred color toner layer. In other words, both of the single-dot expansion process and the single-dot reduction process serve to make the surface area of the paper occupied by the toner transferred first larger than the surface area occupied by toner in the second color.

Figure 5C:
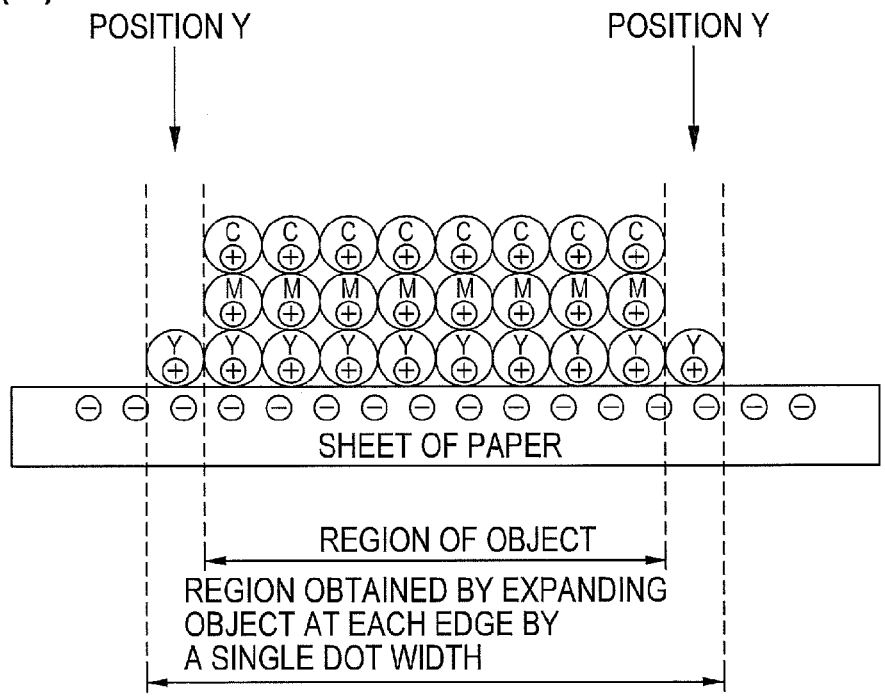
FIG. 5(C) shows a state of toner when a single-dot expansion process is executed onto each edge of an object according to the first embodiment to produce the object using toner in three colors.
Figure 5D:
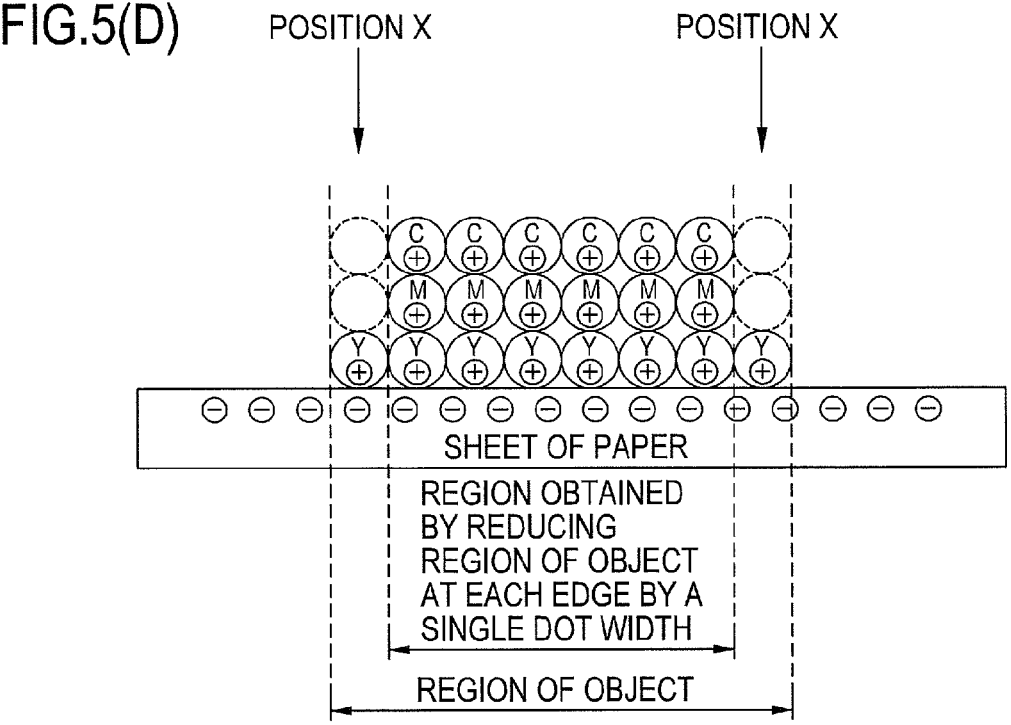
FIG. 5(D) shows a state of toner when a single-dot reduction process is executed onto each edge of an object according to the first embodiment to produce the object using toner in three colors.

It is noted that when generating an object using three or four colors of toner, the CPU 21 executes the process to suppress toner scatter in a manner similar to that described above. More specifically, through the single-dot expansion process, as shown in FIG. 5(C), the first transferred color toner layer (yellow in the drawing) is expanded at each edge by a single dot width along the surface of the paper while the surface area occupied by toner layers of all the other remaining colors that are transferred subsequently to the first transferred color toner layer (second and succeeding color toner layers (magenta and cyan in the drawing)) is not changed. Through the single-dot reduction process, as shown in FIG. 5(D), all the second and succeeding color toner layers (magenta and cyan) are reduced at each edge by a single dot width along the surface of the paper while the surface area occupied by the first transferred color toner layer (yellow) is not changed. Both of the single-dot expansion process and the single-dot reduction process serve to make the positions of the edges in the second and succeeding color toner layers be shifted in a direction toward the inside of the region of the object from the positions of the edges in the first transferred color toner layer. In other words, both of the single-dot expansion process and the single-dot reduction process serve to make the surface area of the paper occupied by the toner transferred first larger than the surface area occupied by toner in the other colors.

A-3. Printing Process

Figure 6:
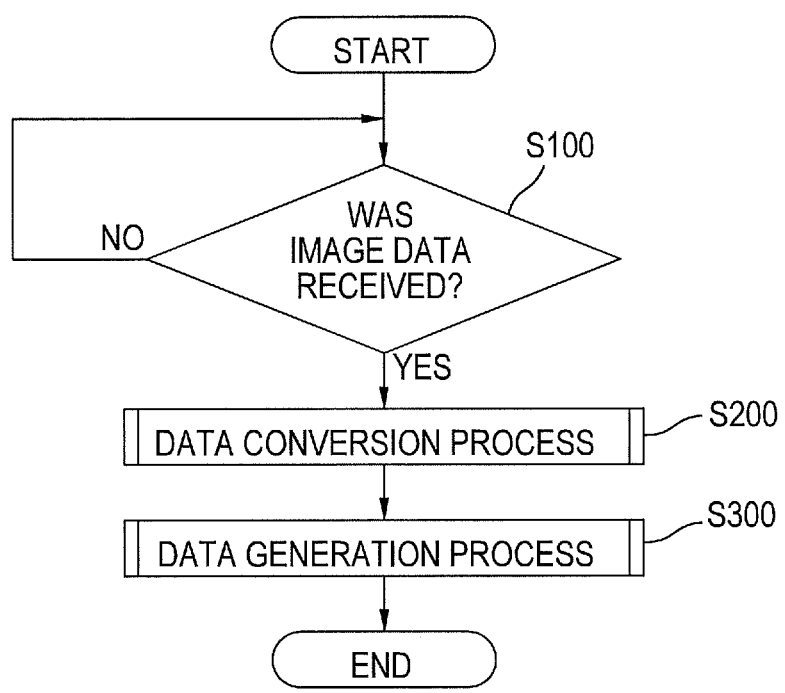
FIG. 6 is a flowchart showing the entire part of a printing process according to the first embodiment.

Next, a printing process executed by the CPU 21 of the color printer 20 according to the first embodiment will be described. The CPU 21 executes the printing process by executing the image formation program 23a. FIG. 6 is a flowchart illustrating steps in the printing process of the embodiment. As shown in FIG. 6, the printing process is configured of a data conversion process and a data generation process. The data conversion process includes a process to generate image data expressed in RGB values through a rasterizing process based on the PDL description of the image. The data generation process includes a process to convert the RGB image data to data expressed in CMYK values and a halftone process executed on the CMYK data. The CPU 21 supplies CMYK halftone data that is obtained through the halftone process to the image forming unit 24, thereby controlling the image forming unit 24 to form an image based on the CMYK halftone data.

During the data generation process, the single-dot expansion process or the single-dot reduction process may be executed onto the CMYK data before the CMYK data is subjected to the halftone process. The single-dot expansion process modifies the CMYK data so that the first transferred color toner layer will be expanded at each edge by a single dot width. In this case, the CMYK data thus modified through the single-dot expansion process is subjected to the halftone process. Similarly, the single-dot reduction process modifies the CMYK data so that all the second (and succeeding) color toner layer(s) will be reduced at each edge by a single dot width. The CMYK data modified through the single-dot reduction process is subjected to the halftone process.

The CPU 21 begins the printing process in FIG. 6 when the color printer 20 receives image data described in PDL from the terminal device 30. In S100 the CPU 21 determines whether image data including drawing commands was received. If the CPU 21 confirms that such image data was received (S100: YES), the CPU 21 advances to the data conversion process of S200.

A-3-1. Data Conversion Process

The data conversion process will be described next with reference to FIG. 7. FIG. 7 is a flowchart illustrating steps in the process.

In S202 at the beginning of the data conversion process, the CPU 21 analyzes the image data described in PDL to identify the first object in the image data for which a drawing process is performed. Specifically, the color printer 20 analyzes the PDL image data in sequence, beginning from the top of the image data, and identifies an object for which a drawing process is executed by the topmost drawing command in the description.

In S204 the CPU 21 executes a drawing process on the identified object. Here, a drawing process is a rasterizing process performed to convert an object described in PDL to an object in the bitmap format by analyzing the drawing command, thereby generating image data for the object. The thus generated image data includes RGB values for pixels constituting the object and the coordinates of the pixels indicating where the pixels constituting the object are positioned in the entire image.

In S206 the CPU 21 identifies attributes of the object for which the drawing process was executed. That is, the CPU 21 identifies the color and shape of the object by analyzing the drawing commands used for drawing the object. Based on this information, the CPU 21 can determine whether the object in question is a target for the process to suppress toner scatter described above.

It is noted that the CPU 21 detects an edge portion of the object through a well-known method when identifying the shape of the object. More specifically, based on the image data (RGB values for pixels constituting the object and the coordinates of the pixels constituting the object) acquired through the drawing process, the CPU 21 determines, as an edge portion, a border at which the RGB pixel values greatly change.

After identifying the attributes of the object, in S208 the CPU 21 determines whether the object in question is an object to be subjected to the process to suppress toner scatter. In other words, the CPU 21 determines whether the object satisfies the condition of having a single-color composition rendered using at least two colors among the CMYK colors of toner.

If the CPU 21 determines that the object is not a target for the process to suppress toner scatter (S208: NO), in S210 the CPU 21 determines that the process to suppress toner scatter will not be executed, and turns off both a single-dot expansion flag and a single-dot reduction flag.

Here, the single-dot expansion flag is set to ON to indicate that the single-dot expansion process is to be executed, and OFF to indicate that the process is not to be executed. Similarly, the single-dot reduction flag is set to ON to indicate that the single-dot reduction process is to be executed, and OFF to indicate that the process is not to be executed. Both flags are written to the RAM 22.

However, if the CPU 21 determines in S208 that the object is a target for the process to suppress toner scatter (S208: YES), in S212 the CPU 21 determines whether the object includes a character of a prescribed size or smaller.

When the CPU 21 determines that the object includes a character of the prescribed size or smaller (S212: YES), in S214 the CPU 21 sets the single-dot reduction flag to ON and the single-dot expansion flag to OFF.

However, if the CPU 21 determines that the object does not include characters of the prescribed size or smaller (S212: NO), in S216 the CPU 21 sets the single-dot expansion flag to ON and the single-dot reduction flag to OFF.

After setting the two flags to ON or OFF in the above process, in S218 the CPU 21 determines whether there remain objects in the image data for which a drawing process has not yet been executed.

When there remain objects in the image data for which the drawing process has not been executed (S218: YES), in S222 the CPU 21 identifies the next object in the image data for which a drawing process will be executed and subsequently executes the drawing process as described above.

However, when the CPU 21 determines in S218 that a drawing process has been completed for all objects in the image data (S218: NO), the CPU 21 ends the data conversion process of FIG. 7 and advances to the data generation process of S300.

A-3-2. Data Generation Process

Next, the data generation process will be described with reference to FIG. 8. FIG. 8 is a flowchart illustrating steps in the data generation process.

In S302 at the beginning of the process in FIG. 8, the CPU 21 identifies the first object to be subjected to a color conversion process. That is, the CPU 21 identifies the object for which the first drawing process was performed in the data conversion process described above as an object to be subjected to color conversion.

In S304 the CPU 21 performs a color conversion process on the selected object. The color conversion process is performed to convert the color space of the object from a color space defined by RGB values to one defined by CMYK values based on a look-up table.

In S306 the CPU 21 calculates the total quantity of toner that will be superimposed on each pixel group in the object subjected to the color conversion process in S304. Specifically, the CPU 21 determines what percentage of toner in each of the CMYK colors will be deposited in each pixel group based on the CMYK values.

In S308 the CPU 21 determines whether there exists any pixel group among the pixels constituting the object whose total quantity of toner is greater than or equal to the prescribed percentage (hereinafter referred to as a candidate pixel group for toner scatter).

If the CPU 21 determines that a candidate pixel group for toner scatter does not exist in the object (S308: NO), the CPU 21 determines that the process to suppress toner scatter need not be performed. In this case, in S318 the CPU 21 simply performs the halftone process on the object. In the embodiment, a method using a dither matrix is employed as the halftone process. The halftone process using a dither matrix is executed according to the method described above.

However, if the CPU 21 determines in S308 that a candidate pixel group for toner scatter exists in the object (S308: YES), in S310 the CPU 21 determines whether the single-dot expansion flag is set to ON for this object. As described above, the single-dot expansion flag is set to ON when a single-dot expansion process is to be executed, and OFF when the process is not to be executed.

Therefore, if the CPU 21 determines that the single-dot expansion flag is ON (S310: YES), in S314 the CPU 21 executes the single-dot expansion process by modifying the image data obtained in S304 so that the first transferred color toner layer is expanded at each edge by a single-dot width. Subsequently, in S318 the CPU 21 executes the halftone process as described above.

However, if the CPU 21 determines that the single-dot expansion flag is OFF (S310: NO), in S312 the CPU 21 determines whether the single-dot reduction flag is set to ON for the current object. As described above, the single-dot reduction flag is set to ON when the single-dot reduction process is to be executed, and OFF when the single-dot reduction process is not to be executed.

Hence, if the CPU 21 determines that the single-dot reduction flag is ON (S312:YES), in S316 the CPU 21 executes the single-dot reduction process by modifying the image data obtained in S304 so that all the toner layer(s) of color transferred subsequent to the first transferred color toner layer is reduced at each edge by a single-dot width. Subsequently, in S318 the CPU 21 executes the halftone process as described above.

Through the steps described above, the CPU 21 completes all steps from the color conversion process in S304 to the halftone process in S318 on a single object. Next, in S320 the CPU 21 determines whether there remain any objects in the image data that have not yet been subjected to the color conversion process.

If the CPU 21 determines that there remain objects for which color conversion has not been performed (S320:YES), in S322 the CPU 21 identifies the next object to be subjected to the color conversion process and executes the process from S304 to S318, as described above.

On the other hand, when the CPU 21 determines that the color conversion process has been completed for all objects in the image data (S320: NO), the CPU 21 ends the data generation process of FIG. 8. The CPU 21 supplies the CMYK halftone data generated through the halftone process of S318 to the image forming unit 24, thereby controlling the image forming unit 24 to form an image based on the CMYK halftone data.

As described above, by executing the image formation program 23a, the CPU 21 performs: an edge detection (A) (FIG. 1) for detecting an edge of an object constituting an image represented by image data received from the terminal device 30 in S206; an object identification (B) for judging whether the object is composed of a single color represented by toner in at least two colors among the CMYK colors in S208; a character judgment (D) for judging whether the object includes a character of a size smaller than or equal to a prescribed size in S212, S214, S216; a total quantity of toner determination (C) for judging whether a percentage of toner included in each of at least one pixel group that constitutes the object and that is made up of the prescribed number of pixels (the number of pixels in the dither matrix) is greater than or equal to the prescribed value (160%) in S306, S308; an edge expansion (E) for executing an edge expansion process on the edge of the object in S310, S314; and an edge reduction (F) for executing an edge reduction process on the edge of the object in S312, S316.

As described above, the image-forming device 20 capable of forming images on paper by forming toner images using toner of each of the colors cyan, magenta, yellow, and black and sequentially transferring the toner images onto the paper controls the image-forming unit 24: by executing the single-dot expansion process for the toner color first transferred onto the paper so that the surface area that this toner color occupies on the paper is expanded more than toner of the other colors; or by executing the single-dot reduction process for the toner color(s) transferred onto the paper subsequently to the toner color first transferred so that the surface area occupied by the toner color(s) transferred subsequently to the first transferred toner color is reduced less than toner of the first transferred color. In this way, the image-forming device 20 of the present embodiment can suitably suppress toner from scattering outside the object.

A-4. Variations of the First Embodiment

Next, a color printer 20 according to a variation of the first embodiment will be described. In the variation, the structure of the color printer 20 and the flow of the printing process shown in FIGS. 6-8 is identical to that described in the first embodiment and, hence, a description will not be repeated here. The variation described here is a process applicable when generating an object using toner in three or more colors.

In the first embodiment described above, the CPU 21 executes either the single-dot expansion process or single-dot reduction process for controlling the image-forming unit 24 so that the surface area of the paper occupied by toner first transferred to the paper is greater than the surface area occupied by toner in other colors.

In the process according to the variation of the embodiment, the CPU 21 executes either the single-dot expansion process or the single-dot reduction process when generating an object using toner in three or more colors so that the following two conditions are met: (I) toner of the color first transferred to the paper must occupy the same surface area of the paper as toner in a color second onto the paper, and (II) both toner transferred first and toner transferred second onto the paper must occupy a greater surface area of the paper than toner in subsequent transfers.

The process according to the variation of the first embodiment is performed so as to meet the above conditions for the following reason. When toner is transferred onto paper in the order black, yellow, magenta, and cyan, toner scatter is less likely to occur between two colors of toner that are successively transferred onto the paper one immediately after the other in the transfer order, as in a pair of black toner and yellow toner and a pair of yellow toner and magenta toner, for example.

It is known that an object is applicable to the present variation if the object, whose color space was converted in the color conversion process of S304, is configured of a single color made up from three or more colors of toner and if the three or more colors include: two colors that are successively transferred onto the paper one immediately after the other; and one or more subsequent color that is transferred subsequently to the first and second successive colors. In this example, it is known that the object is applicable to the present variation if the object is made up of: black and yellow (first and second successive colors) and magenta and/or cyan (one or more subsequent color); or yellow and magenta (first and second successive colors) and cyan (one subsequent color). For such objects, the single-dot expansion process of S314 and the single-dot reduction process of S316 are modified so that the above-described two conditions (I) and (II) will be satisfied. In other words, the single-dot expansion process of S314 and the single-dot reduction process of S316 are modified so that the surface area occupied by both of the toner layers of the first and second successive colors be larger than the third (and succeeding) color layers. In this way, the CPU 21 can form an image in which the color in the edge portion of an object is closer to the original color of the object than when executing the single-dot expansion process or single-dot reduction process as described in the embodiment.

Figure 9A:
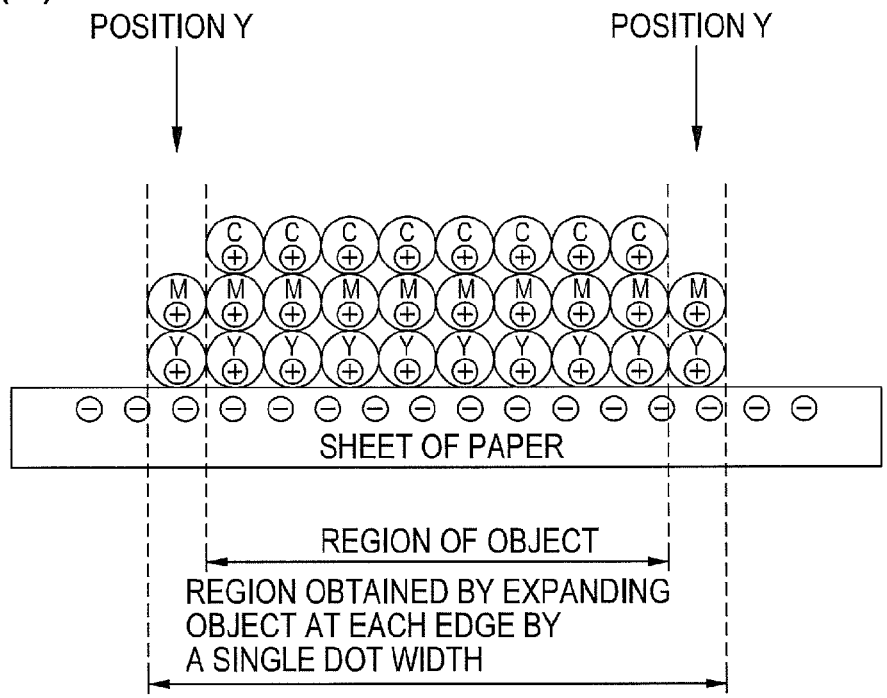
Figure 9B:
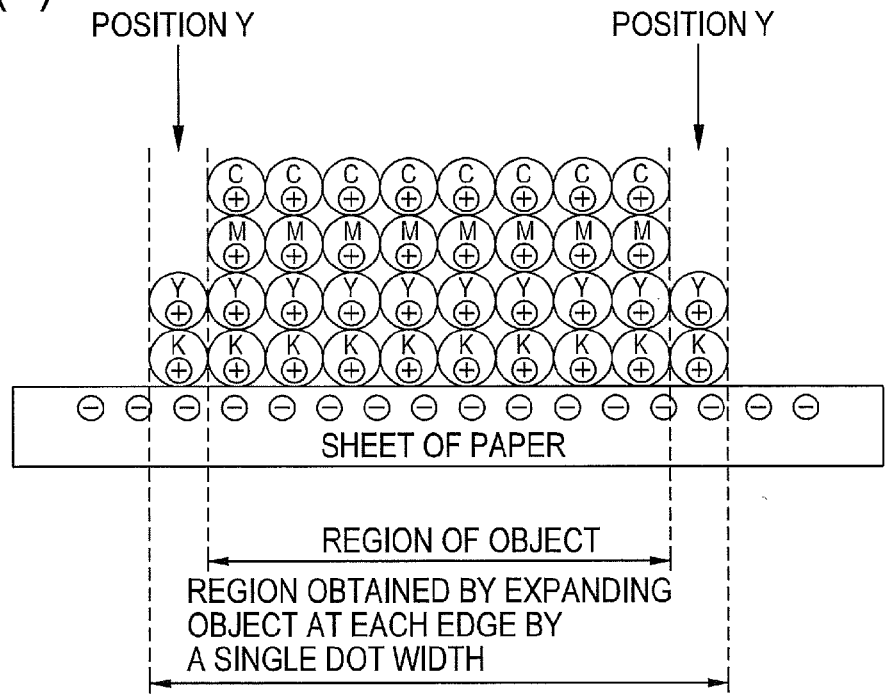

FIGS. 9(A) and 9(B) show the states of toner when the single-dot expansion process is executed according to the variation of the first embodiment to produce an object using toner in three or more colors. FIG. 9(A) shows a case in which the object is produced using three colors of toner, while FIG. 9(B) shows a case in which the object is generated using four colors of toner.

When generating an object with three colors of toner, both yellow toner and magenta toner are transferred to pixels at positions Y, as shown in FIG. 9(A), but cyan toner is not transferred to these pixels. When generating an object with four colors of toner, both black toner and yellow toner are transferred to pixels at positions Y, as shown in FIG. 9(B), but magenta toner and cyan toner are not transferred to these pixels.

Figure 10A:
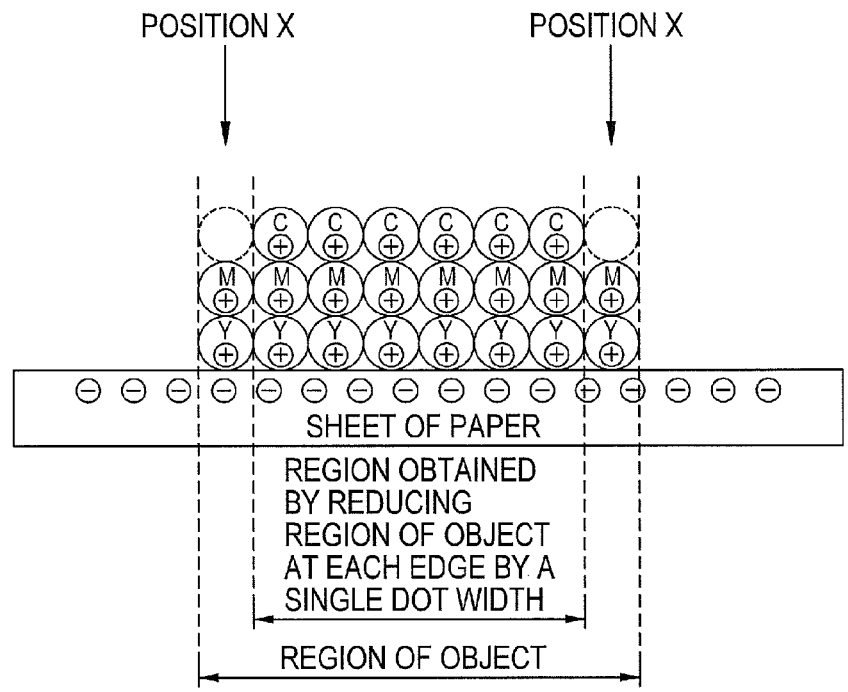
Figure 10B:
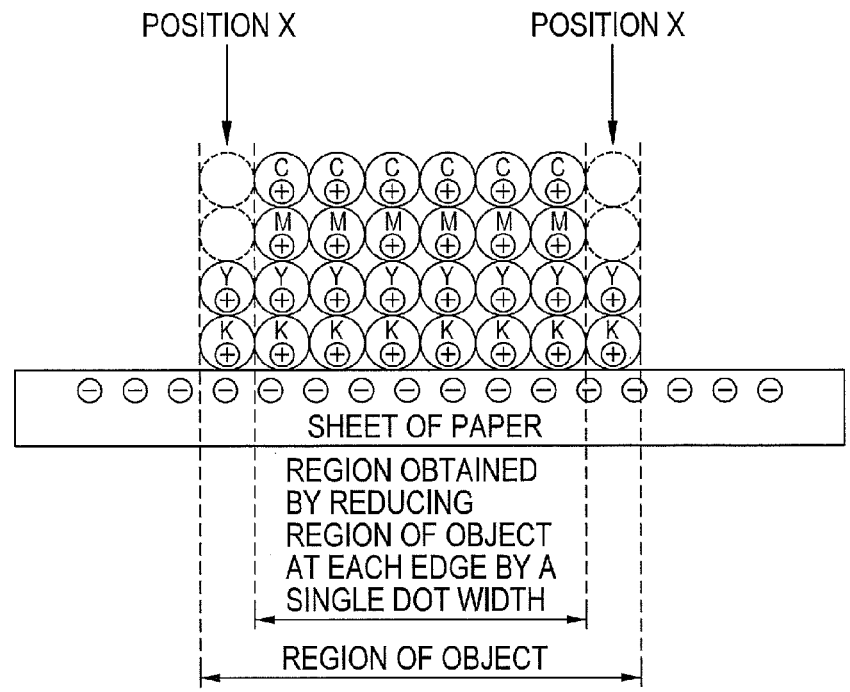

FIGS. 10(A) and 10(B) show the states of toner when executing the single-dot reduction process according to the variation of the first embodiment. FIG. 10(A) shows a case in which the object is produced using three colors of toner, while FIG. 10(B) shows a case in which the object is generated using four colors of toner.

When generating an object using three colors of toner, cyan toner is not transferred to pixels at positions X, as indicated in FIG. 10(A). Further, when generating an object using four colors of toner, neither magenta toner nor cyan toner are transferred to pixels at positions X, as indicated in FIG. 10(B).

In this way, according to this variation, through the single-dot expansion process, the first and second transferred color toner layers are expanded at the edge by a single dot width along the surface of the paper while the surface area occupied by the toner layers of the other remaining color(s) that is transferred subsequently to the second transferred color toner layer is not changed. Through the single-dot reduction process, all the color layers transferred subsequent to the second color toner layer are reduced at the edge by a single dot width along the surface of the paper while the surface area occupied by the first and second transferred color toner layers is not changed.

B. Other Embodiments (1) In the first embodiment and its variation described above, the CPU 21 executes the single-dot expansion process according to the configuration in FIGS. 4(A) and 5(C) or FIGS. 9(A) and 9(B), and the single-dot reduction process according to the configuration in FIGS. 5(A) and 5(D) or FIGS. 10(A) and 10(B). However, the CPU 21 may execute the process to suppress toner scatter according to a separate method from that described above when generating objects using toner in three or more colors. One example will be described here with reference to FIGS. 11(A) and 11(B), which assume that toner is transferred onto paper in the order black, yellow, magenta, and cyan.

Figure 11A:
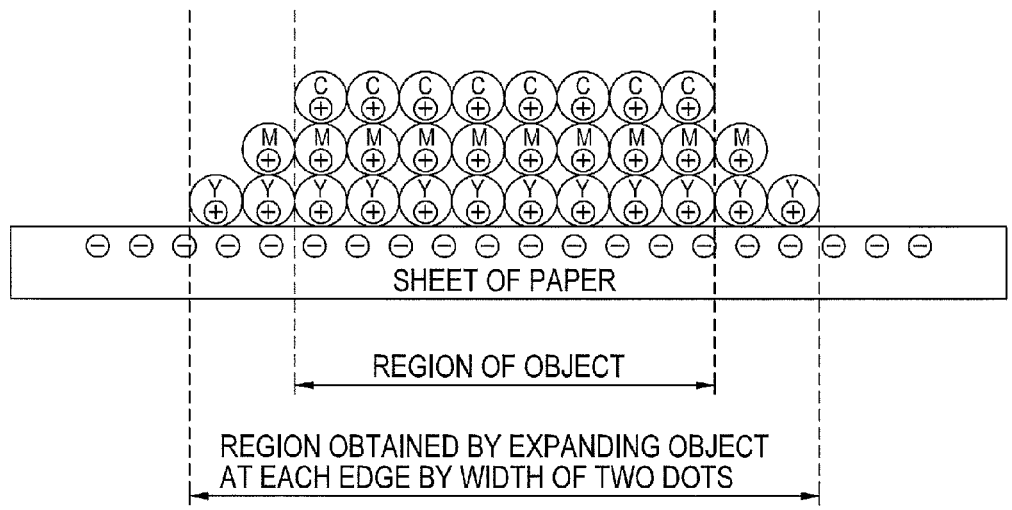
Figure 11B:
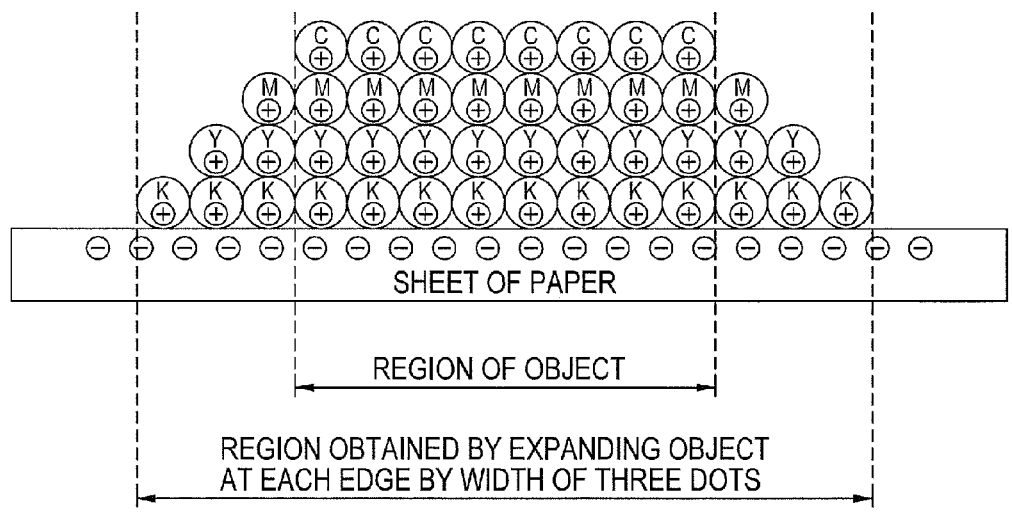

FIG. 11(A) shows a case in which the object is generated using three colors of toner, while FIG. 11(B) shows a case in which the object is generated using four colors of toner. As shown in FIGS. 11(A) and 11(B), the surface area of the paper covered by each color of toner is sequentially larger in the order of toner colors transferred earlier. Consequently, toner of colors transferred later is received by the toner of colors transferred earlier and restrained from scattering outside the object.

While numerous other methods of transferring toner may be employed, all these methods should be configured such that toner in the color transferred to the paper first occupies the largest surface area of the paper among all toner colors.

(2) In the embodiment described above, the CPU 21 is configured to alternate between execution of the single-dot expansion process and single-dot reduction process based on whether the object includes a character of the prescribed size or less. However, the CPU 21 may be configured to change which of the processes to execute by determining whether the object includes a line of a prescribed width or less, for example.

(3) In the embodiment described above, the process to suppress toner scatter is performed on all pixels constituting the edge portion of an object. However, the CPU 21 may instead be configured to execute the process to suppress toner scatter only on pixels constituting an edge portion of the object that exists inside the body portion of the object. For example, if the object is a character "D", for example, one printing region constituting the body of the character "D," an outer non-printing region surrounding the printing region, and an inner non-printing region that is surrounded by the printing region are defined for the object. With respect to such type of character, the process to suppress toner scatter may be executed only to an edge portion between the printing region and the inner non-printing region. The process to suppress toner scatter may not be executed onto an edge portion between the printing region and the outer non-printing region.

Figure 12A:
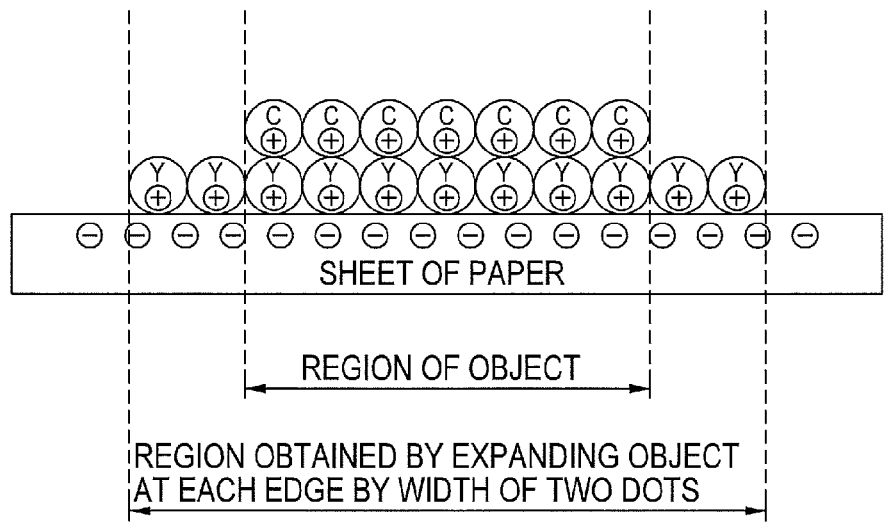
Figure 12B:
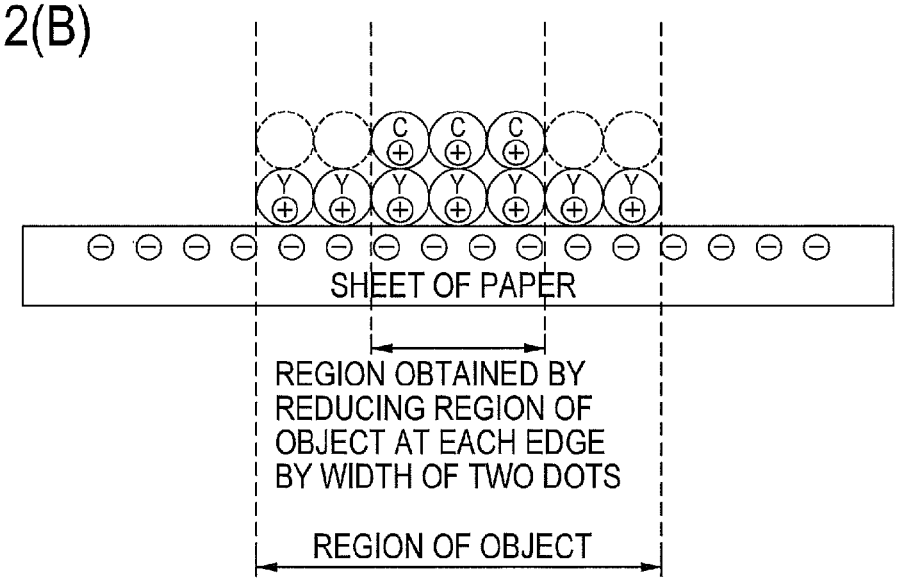

Further, in the embodiment described above, toner of a specific color is either transferred or not transferred to pixels PIb or POb, but a variation of this configuration may be used. For example, as shown in FIG. 12(A), the CPU 21 may execute the single-dot expansion process on two or more pixels that include the pixel POb of the edge portion. Similarly, as shown in FIG. 12(B), the CPU 21 may execute the single-dot reduction process on two or more pixels that include the pixel PIb of the edge portion.

This configuration can increase the potential for suppressing toner scatter.

(4) In the embodiment described above, the CPU 21 executes the process to suppress toner scatter when an object is configured of a single color. However, the CPU 21 may execute this process even when the object is configured of a plurality of colors.

Further, the CPU 21 may execute the process to suppress toner scatter, even when the total quantity of toner included in each of all the pixel groups is less than the prescribed percentage.

In this way, the CPU 21 can perform the process to suppress toner scatter when reducing toner scatter is a priority.

(5) In the embodiment described above, the CPU 21 performs the process to suppress toner scatter irrespective of the user's intention, but the CPU 21 may instead be configured to prompt the user to indicate whether or not to execute the process to suppress toner scatter. In this case, the user can make a selection using the operating unit 26 to indicate whether or not the process to suppress toner scatter should be executed.

(6) In the embodiment described above, the CPU 21 of the color printer 20 controls the image-forming process. However, a CPU provided in the terminal device 30 that is connected to the color printer 20 via the LAN 40 may control the image-forming process.

While the invention has been described in detail with reference to the embodiments thereof, it would be apparent to those skilled in the art that various changes and modifications may be made therein without departing from the spirit of the invention.

What is claimed is:

1. An image forming device, comprising:
a processor; and
a memory storing instructions that, when executed by the processor, cause the image forming device to perform as:
an image forming unit that is configured to form toner images using toner of a plurality of colors and sequentially transfer the toner images onto a recording surface of a recording medium, thereby forming an image on the recording surface of the recording medium;
a rasterizing unit that is configured to receive image data indicative of a desired image containing an object and to rasterize at least part of the received image data that corresponds to the object, thereby generating raster image data indicative of the object;

an edge detecting unit that is configured to detect an edge of the object;

an edge expansion unit that is configured to execute an edge expansion process on the edge of the object by modifying the raster image data so as to expand at least a first toner layer at the edge by a width of a predetermined number of pixels so that a surface area occupied by the first toner layer is larger than a surface area occupied by a second toner layer along the recording surface, the first toner layer comprising toner of a first color that is transferred first onto the recording surface among the plurality of colors, the second toner layer comprising toner of a second color that is different from the first color, the toner of the second color being transferred onto the recording surface after the toner of the first color, the edge expansion unit generating edge-expanded raster image data through modification of the raster image data, and supplying the edge-expanded raster image data to the image forming unit, thereby causing the image forming unit to form an image represented by the edge-expanded raster image data; and an edge process control unit, the edge process control unit comprising:
   an object identifying unit that is configured to judge whether the object satisfies a prescribed condition, the prescribed condition including a condition that the received image data indicates that the object should be represented by a single color that is composed of toner of at least two colors among the plurality of colors; and
   a controlling unit that controls the edge expansion unit not to execute the edge expansion process onto the object if the object identifying unit determines that the object does not satisfy the prescribed condition, and controls the edge expansion unit to execute the edge expansion process onto the object if the object identifying unit determines that the object satisfies the prescribed condition, wherein the raster image data indicates that the first toner layer and the second toner layer should be transferred to a region of the object and no layer of the first toner layer and the second toner layer should be transferred to an outside region of the object, wherein the edge expansion unit is configured to modify the raster image data into the edge-expanded raster image data by adding toner-layer expansion data to the raster image data, the toner-layer expansion data indicating that the first toner layer should be transferred to an expanded edge region that is in the outside region of the object and that is along the edge of the object, the generated edge-expanded raster image data indicating that the first toner layer should be transferred to both the region of the object and the expanded edge region and that the second toner layer should be transferred to the region of the object but should not be transferred to the expanded edge region, wherein the edge-expanded raster image data represents an edge-expanded object that comprises: the first toner layer transferred to both the region of the object and the expanded edge region; and the second toner layer transferred to the region of the object, wherein a size of the edge-expanded object represented by the edge-expanded raster image data is greater than a size of the object represented by the raster image data prior to the modification by the size of the expanded edge region, wherein N number of colors includes the first and the second colors constituting the object, where N is an integer greater than one (1), and wherein the edge expansion unit is configured to execute the edge expansion process by expanding only a toner layer for (N−1) or less number of colors out of the toner layers for all the N number of colors constituting the object.

2. The image forming device as claimed in claim 1, wherein the prescribed condition further includes an additional condition that a percentage of toner included in at least one pixel group among pixel groups constituting the object is greater than or equal to a prescribed value, each pixel group of the pixel groups constituting the object comprising a prescribed number of pixels.

3. The image forming device as claimed in claim 1, wherein the edge process control unit further includes a character judging unit that is configured to judge whether the object includes a character of a size smaller than or equal to a prescribed size, and
   wherein when executed by the processor, the instructions cause the image forming device to further perform as:
   an edge reduction unit that is configured to execute an edge reduction process on the edge of the object by modifying the raster image data so as to reduce the second toner layer at the edge by a width of a predetermined number of pixels so that a surface area occupied by the first toner layer is larger than a surface area occupied by the second toner layer along the recording surface, the edge reduction unit generating edge-reduced raster image data through modification of the raster image data, and supplying the edge-reduced raster image data to the image forming unit, thereby causing the image forming unit to form an image represented by the edge-reduced raster image data,
   wherein the controlling unit controls the edge expansion unit to execute the edge expansion process onto the object if the object identifying unit determines that the object satisfies the prescribed condition and the character judging unit determines that the object includes no character of a size smaller than or equal to the prescribed size, and
   wherein the controlling unit controls the edge reduction unit to execute the edge reduction process onto the object if the object identifying unit determines that the object satisfies the prescribed condition and the character judging unit determines that the object includes a character of a size smaller than or equal to the prescribed size.

4. The image forming device as claimed in claim 3, wherein if the second toner layer is made up of layers of toner in more than one color, the edge expansion process modifies the raster image data so as to expand the first toner layer at the edge by the width of the predetermined number of pixels without changing the surface area occupied by the layers of all the colors making up the second toner layer.

5. The image forming device as claimed in claim 4, wherein if the second toner layer is made up of layers of toner in more than one color, the edge reduction process modifies the raster image data so as to reduce the layers of all the colors making up the second toner layer at the edge by the width of the predetermined number of pixels without changing the surface area occupied by the first toner layer.

6. The image forming device as claimed in claim 3, wherein if the second toner layer is made up of layers of toner in more than one color, the edge expansion process modifies the raster image data so as to expand the first toner layer and a second-first toner layer at the edge by a width of a predetermined number of pixels without changing a surface area occupied by a second-second toner layer, the second-first toner layer constituting the second toner layer and being formed of toner of the second color that is transferred second onto the recording surface, the second-second toner layer constituting the second toner layer and being formed of toner of other remaining color that is transferred onto the recording surface subsequent to the second color.

7. The image forming device as claimed in claim 6, wherein if the second toner layer is made up of layers of toner in more than one color, the edge reduction process modifies the raster image data so as to reduce the second-second toner layer at the edge by the width of the predetermined number of pixels without changing the surface area occupied by the first toner layer and the second-first toner layer.

8. The image forming device as claimed in claim 1, wherein the width of the predetermined number of pixels is the width of one pixel.

9. The image forming device as claimed in claim 1,
wherein the edge-expanded object has a body portion and an expanded edge portion,
wherein the body portion of the edge-expanded object is composed of the first toner layer and the second toner layer that have been transferred to the region of the object, resulting in that color of the body portion of the edge-expanded object is the same as the single color that has been indicated by the raster image data as representing the object, and
wherein the expanded edge portion of the edge-expanded object is composed of the first toner layer that has been transferred to the expanded edge region of the object, resulting in that color of the expanded edge portion differs from the color that has been indicated by the raster image data as representing the object.

10. A non-transitory computer readable medium storing a set of program instructions installed on and executed by a computer for controlling an image forming device to form an image by forming toner images using toner of a plurality of colors and sequentially transferring the toner images onto a recording surface of a recording medium, the program instructions comprising:
receiving image data indicative of a desired image containing an object, and rasterizing at least part of the received image data that corresponds to the object, thereby generating raster image data indicative of the object;
detecting an edge of the object;
judging whether the object satisfies a prescribed condition, the prescribed condition including a condition that the received image data indicates that the object should be represented by a single color that is composed of toner of at least two colors among a plurality of colors;
if the object satisfies the prescribed condition, executing an edge expansion process on the edge of the object by modifying the raster image data so as to expand at least a first toner layer at the edge by a width of a predetermined number of pixels so that a surface area occupied by the first toner layer is larger than a surface area occupied by a second toner layer along the recording surface, the first toner layer comprising toner of a first color that is transferred first onto the recording surface among the plurality of colors, the second toner layer comprising toner of a second color that is different from the first color, the toner of the second color being transferred onto the recording surface after the toner of the first color, modification of the raster image data through the edge expansion process generating edge-expanded raster image data; and
forming toner images based on the edge-expanded raster image data by using toner of the plurality of colors and sequentially transferring the toner images onto the recording surface of the recording medium, thereby forming an image represented by the edge-expanded raster image data on the recording surface of the recording medium,
wherein the raster image data indicates that the first toner layer and the second toner layer should be transferred to a region of the object and no layer of the first toner layer and the second toner layer should be transferred to an outside region of the object,
wherein the edge expansion process modifies the raster image data into the edge-expanded raster image data by adding toner-layer expansion data to the raster image data, the toner-layer expansion data indicating that the first toner layer should be transferred to an expanded edge region that is in the outside region of the object and that is along the edge of the object, the generated edge-expanded raster image data indicating that the first toner layer should be transferred to both the region of the object and the expanded edge region and that the second toner layer should be transferred to the region of the object but should not be transferred to the expanded edge region,
wherein the edge-expanded raster image data represents an edge-expanded object that comprises: the first toner layer transferred to both of the region of the object and the expanded edge region; and the second toner layer transferred to the region of the object,
wherein a size of the edge-expanded object represented by the edge-expanded raster image data is greater than a size of the object represented by the raster image data prior to the modification by the size of the expanded edge region,
wherein N number of colors includes the first and second color constituting the object, where N is an integer greater than one (1), and
wherein the edge expansion process is executed to expand only a toner layer for (N−1) or less number of color out of the toner layers for all the N number of colors constituting the object.

11. An image forming device, comprising:
a processor; and
a memory storing instructions that, when executed by the processor, cause the image forming device to perform as:
an image forming unit that is configured to form toner images using toner of a plurality of colors and sequentially transfer the toner images onto a recording surface of a recording medium, thereby forming an image on the recording surface of the recording medium;
a rasterizing unit that is configured to receive image data indicative of a desired image containing an object and to rasterize at least part of the received image data that corresponds to the object, thereby generating raster image data indicative of the object;
an edge detecting unit that is configured to detect an edge of the object;
a character judging unit that is configured to judge whether the object includes a character of a size smaller than or equal to a prescribed size; and an edge controlling unit configured to control the edge of the toner layers constituting the object based on whether the object includes a character of a size smaller than or equal to the prescribed size, the edge controlling unit comprising:
- an edge expansion unit that is configured to execute an edge expansion process on the edge of the object by modifying the raster image data so as to expand at least a first toner layer at the edge by a width of a predetermined number of pixels so that a surface area occupied by the first toner layer is larger than a surface area occupied by a second toner layer along the recording surface, the first toner layer comprising toner of a first color that is transferred first onto the recording surface among the plurality of colors, the second toner layer comprising toner of a second color that is different from the first color and that is transferred onto the recording surface after the first color, the edge expansion unit generating edge-expanded raster image data through modification of the raster image data, and supplying the edge-expanded raster image data to the image forming unit, thereby causing the image forming unit to form an image represented by the edge-expanded raster image data, and the edge expansion unit being configured to output the edge-expanded raster image data such that size of an edge-expanded object represented by the edge-expanded raster image data is greater than the size of the object represented by the raster image data prior to the modification; and
- an edge reduction unit that is configured to execute an edge reduction process on the edge of the object by modifying the raster image data so as to reduce the second toner layer at the edge by a width of a predetermined number of pixels so that a surface area occupied by the first toner layer is larger than a surface area occupied by the second toner layer along the recording surface, the edge reduction unit generating edge-reduced raster image data through modification of the raster image data, and supplying the edge-reduced raster image data to the image forming unit, thereby causing the image forming unit to form an image represented by the edge-reduced raster image data, the edge reduction unit being configured to output the edge-reduced raster image data such that the size of the an edge-reduced object represented by the edge-reduced raster image data is equal to the size of the object represented by the raster image data prior to the modification, wherein the edge controlling unit controls the edge expansion unit to execute the edge expansion process if the character judging unit determines that the object includes no character of a size smaller than or equal to the prescribed size, and wherein the edge controlling unit controls the edge reduction unit to execute the edge reduction process if the character judging unit determines that the object includes a character of a size smaller than or equal to the prescribed size, wherein the raster image data indicates that the first toner layer and the second toner layer should be transferred to a region of the object and no layer of the first toner layer and the second toner layer should be transferred to an outside region of the object, wherein the edge expansion unit is configured to modify the raster image data into the edge-expanded raster image data by adding toner-layer expansion data to the raster image data, the toner-layer expansion data indicating that the first toner layer should be transferred to an expanded edge region that is in the outside region of the object and that is along the edge of the object, the generated edge-expanded raster image data indicating that the first toner layer should be transferred to both the region of the object and the expanded edge region and that the second toner layer should be transferred to the region of the object but should not be transferred to the expanded edge region, wherein the edge-expanded raster image data represents an edge-expanded object that comprises: the first toner layer transferred to both of the region of the object and the expanded edge region; and the second toner layer transferred to the region of the object, and wherein a size of the edge-expanded object represented by the edge-expanded raster image data is greater than a size of the object represented by the raster image data prior to the modification by the size of the expanded edge region.

* * * * *